(12) United States Patent
Eckstein et al.

(10) Patent No.: US 12,534,225 B1
(45) Date of Patent: Jan. 27, 2026

(54) SATELLITE DISPENSING SYSTEM

(71) Applicant: Blue Origin Manufacturing, LLC, Huntsville, AL (US)

(72) Inventors: Eric Eckstein, Renton, WA (US); Brian Allen Cyb, Seattle, WA (US)

(73) Assignee: Blue Origin, LLC, Kent, WA (US)

( * ) Notice: Subject to any disclaimer, the term of this patent is extended or adjusted under 35 U.S.C. 154(b) by 530 days.

(21) Appl. No.: 17/557,341

(22) Filed: Dec. 21, 2021

(51) Int. Cl.
*B64G 1/64* (2006.01)

(52) U.S. Cl.
CPC .............. *B64G 1/641* (2013.01); *B64G 1/648* (2013.01); *B64G 1/643* (2023.08)

(58) Field of Classification Search
CPC ..................... B64G 2001/643; B64G 1/645
See application file for complete search history.

(56) References Cited

U.S. PATENT DOCUMENTS

| | | | | |
|---|---|---|---|---|
| 2011/0240802 A1* | 10/2011 | Balinov | ................. | B64G 1/641 244/173.3 |
| 2016/0031572 A1* | 2/2016 | Dube | ..................... | B64G 1/641 244/173.1 |

OTHER PUBLICATIONS

"CubeSat Design Specification (CDS) Revision 9." CubeSat, Jun. 3, 2004, available at https://org.ntnu.no/studsat/docs/proposal_1/A8%20-%20Cubesat%20Design%20Specification.pdf. (Year: 2004).*
"Deployers and Rail Sizes." Hackaday.io, Jul. 13, 2015, https://hackaday.io/project/6647-rapidly-deployable-automation-system/log/20879-deployers-and-rail-sizes. (Year: 2015).*
"NanoRacks CubeSat Deployer (NRCSD) Interface Definition Document (IDD)." Nanoracks, Jun. 4, 2018, available at https://s3vi.ndc.nasa.gov/ssri-kb/static/resources/Nanoracks-CubeSat-Deployer-NRCSD-IDD.pdf. (Year: 2018).*

* cited by examiner

Primary Examiner — Joshua J Michener
Assistant Examiner — Ka Chun Leung
(74) Attorney, Agent, or Firm — Summit Patents PC

(57) ABSTRACT

Stacked satellite dispensing systems are described herein. The disclosed systems can release individual satellites or small batches of satellites from a satellite stack in a controlled manner. Dispensing individual satellites at different locations in space can more evenly dispense satellites or to dispense satellites at distinct locations. A deployment system, including a motor, a cable, and spacers, can allow for the individual satellites to be deployed from the satellite stack. The disclosed satellite dispensing systems also include spacers that are positioned between two or more satellites to help attenuate the force of the mass of satellites stacked above.

22 Claims, 4 Drawing Sheets

SATELLITE DISPENSING SYSTEM

BACKGROUND

Satellite dispensing systems are stored in a cavity of a payload fairing of a launch vehicle, such as a rocket. The satellite dispensing systems are launched into space by the launch vehicle. After launch, the launch vehicle reaches a desired orbit, and conventional satellite dispensing systems release or launch the satellites en masse into orbit. Conventional satellite dispensing systems comprise an array of satellites mounted to a central structure (e.g., corncob-style).

Conventional satellite dispensing systems mount each satellite to a central structure using individual release mechanisms for each satellite, such as clamp-band rings, separation nuts or hold-down-and-release actuators. The cost of these mechanisms comprises a significant portion of the satellite unit cost, especially when a large number of small satellites make up the payload. Therefore it is desirable for a dispenser to cluster multiple payloads under a shared release system, therefore reducing the number of costly actuators required to dispense payloads.

The present art of clustering multiple satellites under shared release mechanisms is embodied by the Starlink dispenser, in which a stack of 60 satellites is released by only 4 vertical hold-down actuators. However, this approach is disadvantaged by the fact that the satellite stack receives no lateral support except at its base, and therefore lateral loads in the stack must necessarily be carried through the payloads themselves. The lateral accelerations are greatest prior to jettisoning the payload fairing because, during launch, the launch vehicle with the payload fairing passes through high-altitude winds under extreme force. These high-altitude winds push the launch vehicle laterally. Accordingly, the number of satellites is limited by a maximum lateral force the dispensing system can withstand. Additionally, the structural mass required to sustain these loads becomes parasitic mass for the lifetime of the satellite following launch vehicle separation, which in turn reduces the satellite's orbital maneuvering performance. Therefore, it is advantageous to laterally support the satellites using a supporting structure.

The art would benefit from a means to combine the cost advantages of clustering a stack of payloads under a shared release system, with the payload capacity and mass efficiency advantages of providing lateral support to the satellite stack.

DETAILED DESCRIPTION

Figure 1:
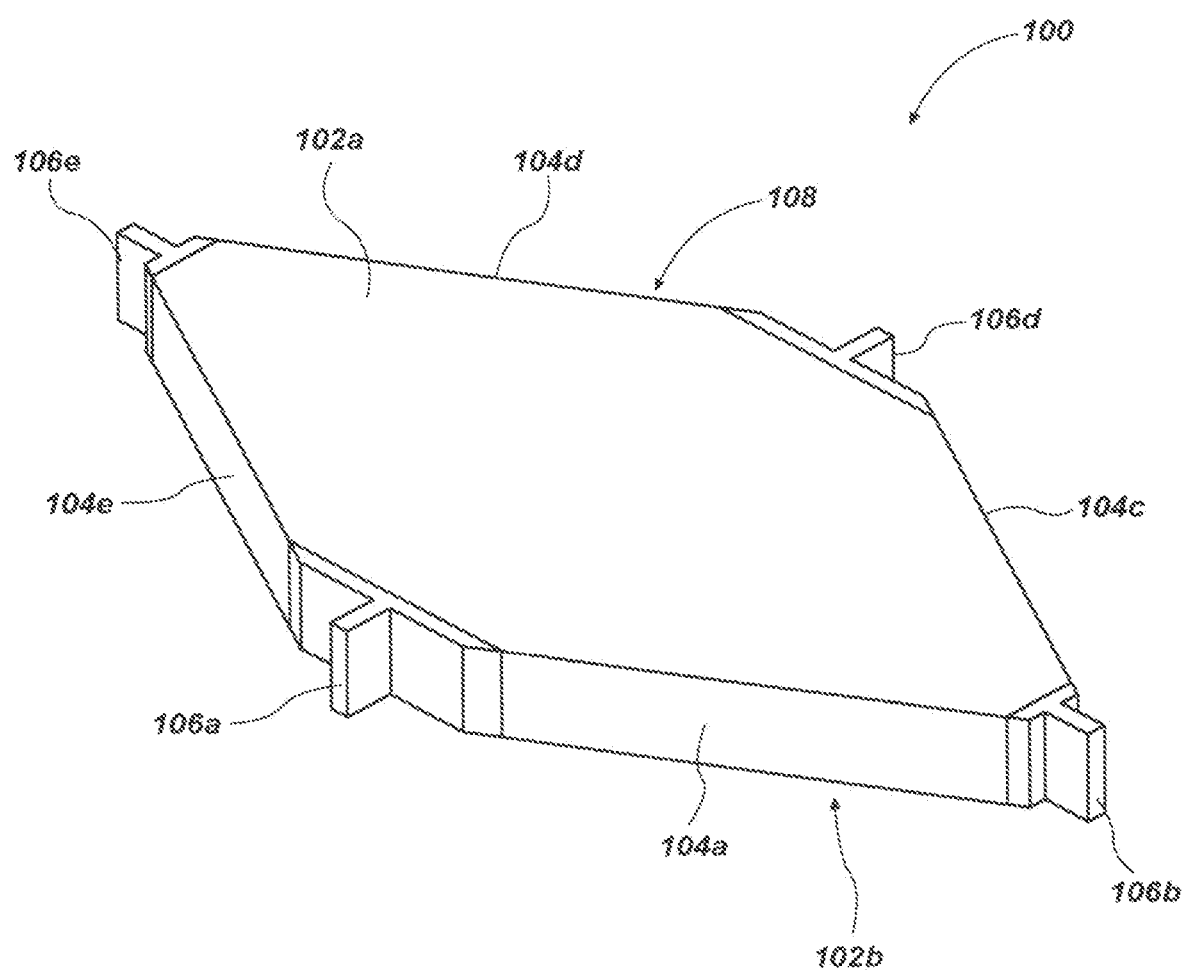
FIG. 1 illustrates an example satellite.

Stacked satellite dispensing systems and methods are described herein that have improved stability and improved control of satellite dispensing. For example, aerospace and rocket designers focus on improving the stability of a satellite stack while also minimizing overall structural mass of the rocket. Aerospace and rocket designers also focus on dispensing satellites individually and more evenly in an orbit. Accordingly, the disclosed satellite dispensing systems include stacking and releasing satellites via a universal interface and a controlled release mechanism.

The stacked satellite dispensing system includes racks or channels and dispensing mechanism, such as a cable and pulley system. A stack of satellites can be placed into the stacked satellite dispensing system and constrained along linear rails than line the racks or channels prior to launch. The satellites are deployed by moving them linearly along these rails. The rail-guided dispenser helps attenuate some of the structural load of the stacked satellites. The stacked satellite dispensing system also includes a cable-and-pulley system to raise the satellites along the rails and away from a base on the which the satellites rest. The cable can be attached to a motor, such as a winch motor. The motor pulls the cable towards it to raise the satellites along the rails and deploy the satellites from the satellite stack. Spacers can be positioned between satellites, either in batches or between each satellite in the stack. The spacers engage with individual satellites or groups of satellites of the satellite stack depending on their placement and can be attached to or controlled by the cable.

The rail-guided deployment mechanism allows any number of satellites to be deployed at a given time without the use of individual deployment actuators like pyrotechnics. Dispensing individual satellites at different locations in orbit can more evenly dispense satellites or dispense satellites at distinct locations to improve the precision of the placement of each satellite in orbit. This improved dispensing technique increases the number of satellites that can be included in a fairing at a time because the satellites are dispensed in a more precise manner. The improved dispensing techniques reduce the number of required launches, increase dispensing efficiency and accuracy, and reduce cost.

The rail-guided dispensing system does not require each satellite to be load-bearing because spacers are placed at strategic locations between the satellites to attenuate force assumed by satellite weight and launch forces. This reduces weight placed on each of the satellites, which is valuable because of the need for the satellites to execute launch maneuvers following deployment from the dispensing system. The overall stack maximum is limited by the largest load the satellite on the bottom of the stack can withstand. With the spacers, the load the satellite on the bottom of the stack can withstand is reduced to allow the number of satellites in the stack to increase.

The rail-guided dispensing system can also reduce or eliminate the number of pyrotechnics incorporated into the satellite stack or dispensing system. Pyrotechnics can be costly, unreliable (i.e., fail to fire), a safety concern, or both. Removing or reducing the number of pyrotechnics can reduce the cost of the satellite stack deployment system and improve the reliability of the satellite stack or deployment.

The rail-guided dispensing system can also be made to be compatible with a variety of satellite designs. Satellite designers can design and build satellites that include or can be adapted to a universal mating interface. The universal mating interface can fit multiple satellites designs while still allowing the rail-guided dispensing system to be used. Further, vertical and diagonal struts help the satellite stacks withstand lateral forces, especially during launch, by giving structural support across the width of the stack.

FIG. 1 shows an individual satellite 100 of a satellite stack (i.e., multiple satellites stacked on top of each other). Once dispersed or deployed from the satellite stack, the satellite 100 can become part of a satellite constellation (i.e., multiple satellites which form a network in an orbit), such that each satellite of the satellite constellation can communicate with other satellites of the satellite constellation or a ground transceiver. The satellite constellation can be used as a communication system or for space observation, Internet or telecommunications service, or the like, with each satellite acting as a node within the network.

The satellite 100 includes a main body 108. The main body 108 can house or include components, devices, or systems. The main body 108 can provide a surface to support the components, devices, or systems, or to which the components, devices, or systems can be attached. The main body 108 can also encase or partially encase the components, devices, or systems to protect the components, devices, or systems from external forces or elements.

The main body 108 includes a first side 102*a* and a second side 102*b* adjoined by sidewalls 104*a*-104*d*. The sidewalls 104*a*-104*d* can form an external surface of the satellite stack. The sidewalls can also form an internal cavity of the satellite stack, such as when in a circle or circular shape. The side walls can form any suitable contour or shape of the satellite.

The main body 108 can also include channel interfaces 106*a*-106*d* (e.g., projections). In one example, the channel interfaces 106*a*-106*d* can be extensions of or integrated with the main body 108 (i.e., the channel interfaces 106*a*-106*d* and the main body 108 are a single piece). In another example, the channel interfaces 106*a*-106*d* can be connectable or attachable to the satellite 100, which permit various satellite configurations to be compatible with a stacked satellite dispensing system. Such a "universal" channel interface provides a satellite agnostic option for any satellite to be fitted into the disclosed satellite dispensing systems. As discussed above, any number of satellite interfaces can be included, depending on the satellite stack configuration of the channels or rails or the lateral stability needs of the system and depending on the size and shape of the satellites themselves. Not all rails need to be fitted with a channel interface although fitting all rails with a channel interface provides the most available stability for the satellite stack.

The channel interfaces can be a projection, such as those shown in FIG. 1, that fit within a mating channel in a rail of the guided satellite dispensing system. The example satellite interfaces shown in FIG. 1 are rectangular projections of uniform size, shape, and length although alternative examples can vary the shape, size, length, or other physical characteristics of the channel interface(s).

The channel interfaces 106*a*-106*d* can be located on the sidewalls (e.g., sidewalls 104*a*-104*d*) of the satellite 100, on corners of the satellite formed by adjoining sidewalls (e.g., sidewalls 104*a*-104*d*), or on both sidewalls and corners of the satellite 100.

The main body 108 can be any appropriate shape or contour. Therefore, the satellite 100 can include any appropriate number of sidewalls 104*a*-104*d* and channel interfaces 106*a*-106*d*. The sidewalls 104*a*-104*d* or channel interfaces 106*a*-106*d* can be removable. The sidewalls 104*a*-104*d* or channel interfaces 106*a*-106*d* can be rectilinear, circular, ovular, or rhomboidal or any other suitable shape. Furthermore, the satellite 100 can include any appropriate number of channel interfaces 106*a*-106*d* based on the shape or configuration of the main body 108.

Figure 2:
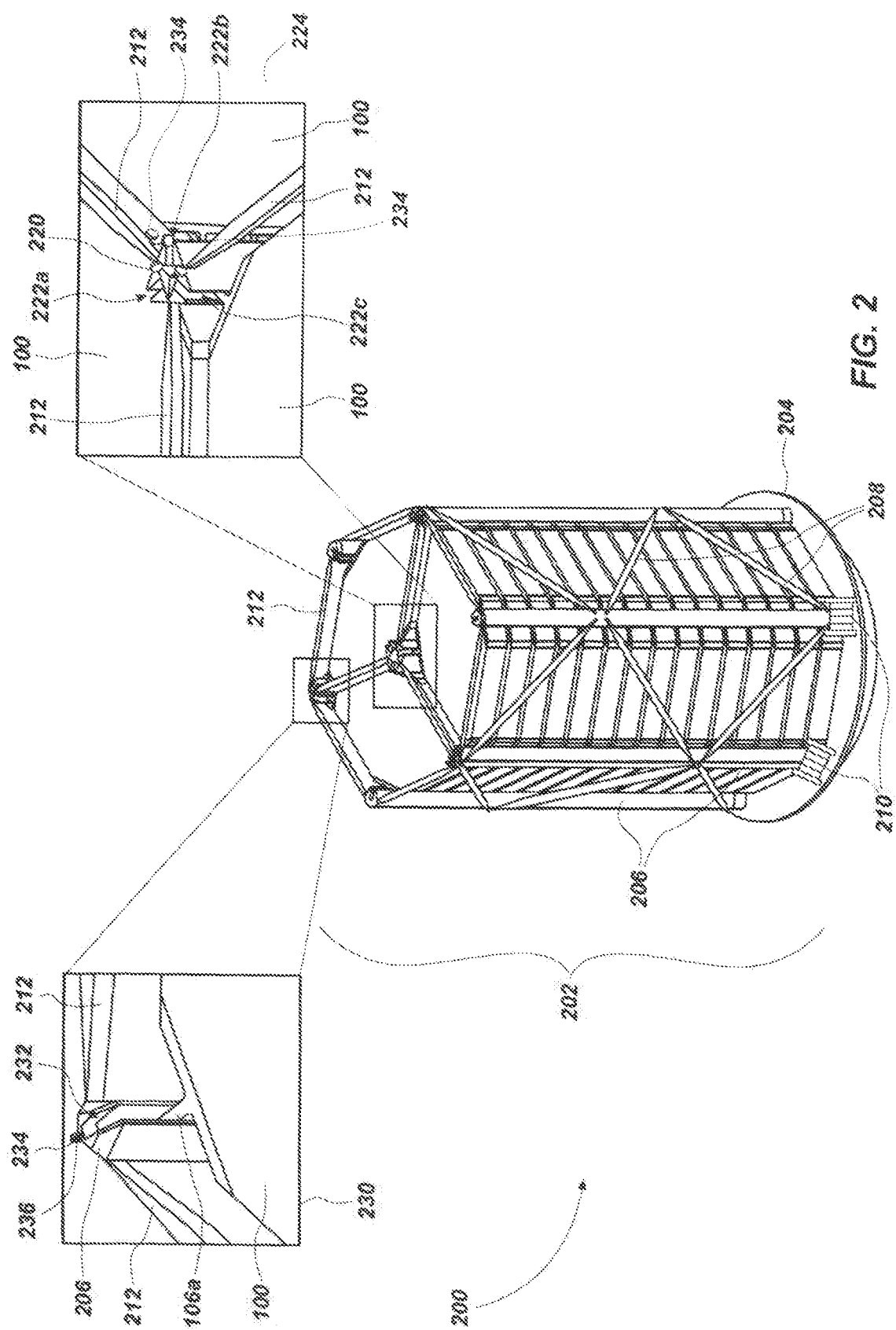
FIG. 2 illustrates an example stacked satellite dispensing system.

FIG. 2 shows a stacked satellite dispensing system 200. The stacked satellite dispensing system 200 includes a base 204 and a satellite stack 202. The first side 102*a* of the individual satellites, when in the satellite stack 202, faces a satellite above or below satellite 100. The second side 102*b* of the individual satellites, when in the satellite stack 202, faces a satellite above or below satellite 100 or faces the base 204, such as when the satellite 100 is on the bottom of the satellite stack 202. In the example shown in FIG. 2, all of the satellites in the stack are a uniform size, shape, and contour although alternative examples may have satellites of different size, shape, or contour in the same stack.

The base 204 is a platform on which the satellite stack 202 is supported. The satellite stack 202 includes three columns of satellites 100, such that each column includes multiple, vertically-stacked satellites. Each satellite of the multiple satellites is represented by the satellite 100. The satellite stack 202 can include any appropriate number of columns (e.g., 1, 2, 3, 4, or more) based on the configuration of the satellites 100, the total load (i.e., mass or volume) of the satellite stack 202, the number of satellites 100 to be deployed, the like, or combinations thereof.

The stacked satellite dispensing system 200 also includes external support columns 206. The satellite stack 202 can include two or more external support columns 206 based on the number of sides or edges, based on the mass to be supported, or combinations thereof. Each external support column 206 extends from the base 204 in the same direction as the satellite stack 202. The heights of the external support columns 206 can be greater than or equal to the height of the satellite stack 202. The external support columns 206 can be on an external surface of the satellite stack 202.

The stacked satellite dispensing system 200 also includes diagonal struts 208. The diagonal struts 208 extend between adjacent external support columns 206 at oblique angles. The diagonal struts 208 stabilize the satellite stack 202 horizontally and vertically without adding performance-reducing mass. Rather than stabilizing one or two axes (e.g., one or two of the x-axis, y-axis, and z-axis), the diagonal struts 208 increase stability along all 3 axes (e.g., x-axis, y-axis, and z-axis). The increased stability allows for heavier and taller satellite stacks 202 (i.e., satellite stacks with more total satellites) to be used.

The stacked satellite dispensing system 200 also includes horizontal struts 212. The horizontal struts 212 extend between adjacent external support columns 206. The horizontal struts 212 are parallel to a surface of the base 204 on which the satellite stack 202 is supported. In one example, the horizontal struts 212 extend between the external support columns 206 at the top ends of the adjacent external support columns 206. The horizontal struts 212 can also extend between the external support columns 206 and a central internal column 220.

The stacked satellite dispensing system 200 can also include a central internal column 220, as shown in magnified view 224. The central internal column 220 can be included when the satellite stack 202 includes two or more columns of satellites. The central internal column 220 is located along a central axis of the satellite dispensing system 200. The central internal column 220 includes channels 222*a*-222*c* (e.g., a first channel, a second channel, and a third channel) to guide the channel interfaces 106*a*-106*d* of the satellites 100.

The channels 222*a*-222*c* include a length extending from a base end (i.e., an end proximal to or in contact with the base 204) of the central internal column 220 to an output (i.e., a top end of the central internal column 220 and an end opposite the base end). The channels 222*a*-222*c* are complementary to the channel interface 106*a*-*d* which aligns with or is inserted into one of the channels 222*a*-222*c*. Insertion of one of the channel interfaces 106*a*-106*d* into one of the channels 222*a*-222*c* forms a universal mating interface. As the satellite 100 travels towards the base 204 (e.g. during loading) or away from the base 204 (e.g., during dispensing), the universal mating interface restricts rotation of the satellite 100 within the satellite stack 202. The universal mating interface also controls the direction or axis along which the satellite 100 translates. The universal mating interface can also stabilize the satellite 100 with the stacked satellite dispensing system 200.

The number of channels 222a-222c of the central internal column 220 correlates to the number of columns of the satellite stack 202. The number of channels 222a-222c of the central internal column 220 can be equal to the number of columns of the satellite stack 202. In one example, for a satellite stack having two satellite columns, the central internal column 220 has two channels (i.e., a first channel to guide a first column and a second channel to guide a second column). In another example, for a satellite stack having three satellite columns, the central internal column 220 has 3 channels (i.e., a first channel to guide a first column, a second channel to guide a second column, and a third channel to guide a third column).

Each external support column 206 includes a channel 232 having a length extending from a base end (i.e., an end proximal to or in contact with the base 204) of the external support column 232 to an output (i.e., a top end of the external support column 232 and an end opposite the base end), as shown in magnified view 230. The channel 232 is complementary to the channel interface 106a-d that aligns with or is inserted into the channel 232. Insertion of one of the channel interfaces 106a-106d into one of the channel 232 forms a universal mating interface. As the satellite 100 travels towards the base 204 (e.g. during loading) or away from the base 204 (e.g., during dispensing), the universal mating interface restricts rotation of the satellite 100 within the satellite stack 202. The universal mating interface also controls the direction or axis along which the satellite 100 translates. The universal mating interface can also stabilize the satellite 100 with the stacked satellite dispensing system 200.

Though the channel interfaces 106a-106d of the satellite 100 are male and the channels of the external support columns are female, the universal mating interfaces are not intended to be so limited. For example, the channel interfaces 106a-106d can be transposed to the external support columns and the channels can be transposed to the satellite 100. As another example, the universal mating interfaces can include detents or ratchets.

Each external support column 206 and each channel 222a-222c of the central internal column 220 may also include a pulley 234 at the top end, as shown in magnified views 224 and 230. The pulley 234 can extend outwardly from the external support column 206 in any desired orientation, including vertically, horizontally, or diagonally. The pulley 234 can be a wheel adjoined to an axle or a sheave (i.e., a channeled rim). The pulley 234 can reduce the amount of force necessary to lift the satellite 100 away from the base 204 via a cable 236. The pulley 234 can also redistribute the direction of the force necessary to lift the satellite 100.

The stacked satellite dispensing system 200 includes motors 210 at or proximal to each of the external support columns 206. Each motor 210 is connected to each of the cables 236 (i.e., one cable per motor). Each of the cables 236 run along an external surface of the respective external support columns 206 and down the length of the channel 232. Alternatively, multiple cables can be connected to single motor.

Figure 3:
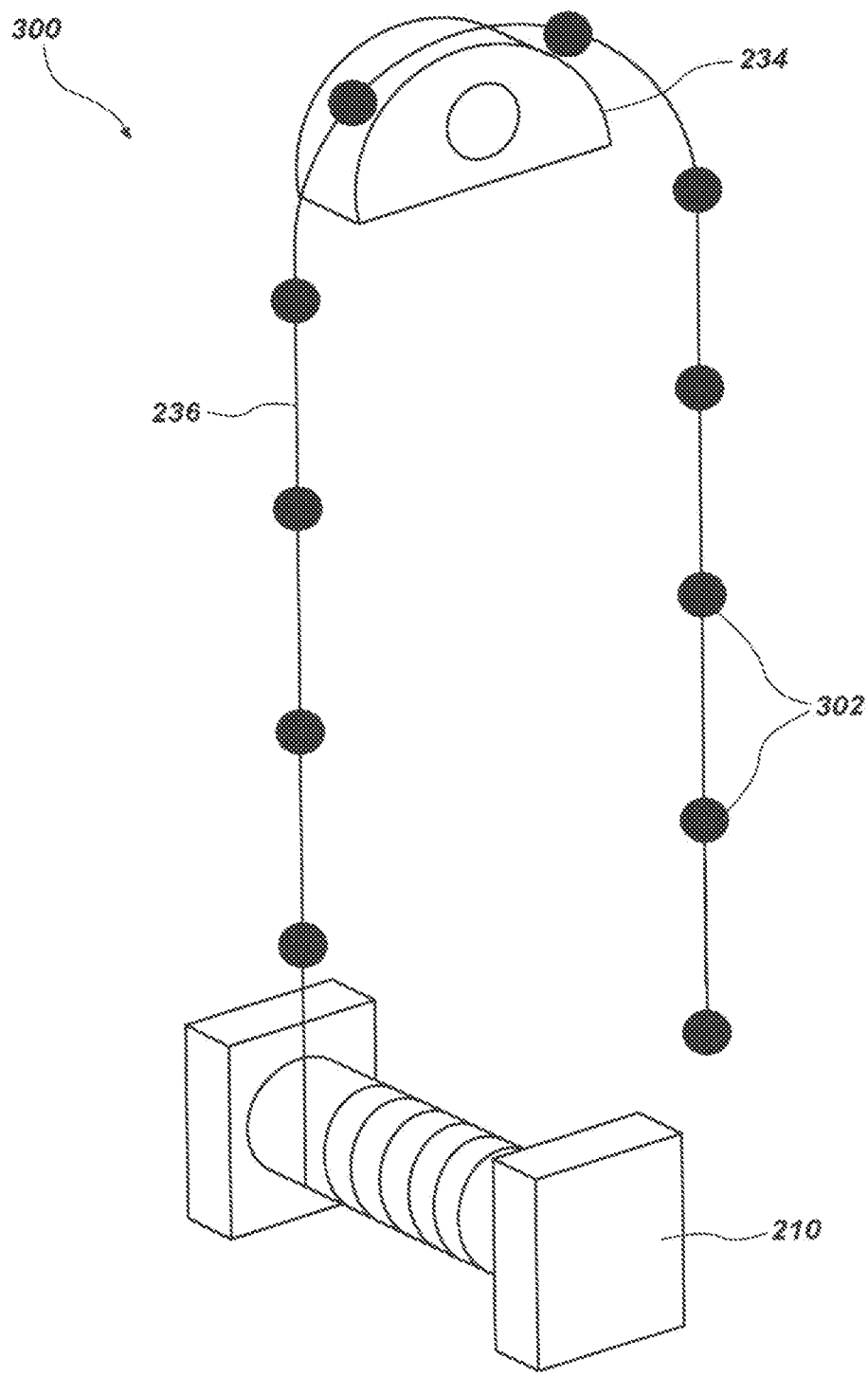
FIG. 3 illustrates an example cable-pulley system of the example stacked satellite dispensing system.

FIG. 3 shows a dispensing element to dispense the satellites 100. The dispending element causes the satellites 100 to move in a direction towards the output of the channels 222a-222c, 232. The dispensing element can be a cable-pulley system 300, an extending platform, or combinations thereof. In one example, the cable-pulley system 300 including the motor 210, the cable 236, and the pulley 234. To move the cable 236, the motor 210 is activated. The motor 210 draws or pulls a portion of the cable 236 at the pulley 234 towards the base 204. While a motor is shown in FIG. 3, alternatives to cause the dispensing element to move can be used, such as mechanical systems.

In one example, the cable 236 engages with the channel interfaces 106a-106d or the main body 108. In another example, the cable 236 engages with spacers 302 or the channel interfaces 106a-106d. The spacers 302 can be separated by a distance equal to or slightly greater than the height of the satellite 100. The spacers 302 can be attached to the cable 236, attached to the satellite 100, or not attached to but in contact with the cable 236, the satellite 100, or the cable 236 and the satellite.

The spacers 302, for example, can be spheres, platforms (e.g., squares or rectangles), tabs, or combinations thereof. The spacers 302 separate adjacent satellites 100 or a first group of satellites from a second group of satellites. The spacers 302 can also provide surfaces to support each satellite 100 within the satellite stack 202. The spacers 302 also act as a surface to exert a force on the satellite 100 supported by the spacer 302.

The spacer 302 can be integrated with or attached to the dispensing element (e.g., the cable 236) or the channel interface 106a-106d. Alternatively, the spacer 302 and the channel interface 106a-106d can be integrated with or attached to the dispensing element (e.g., the cable 236).

The cable-pulley system 300 can be used to retain the satellite 100 and dispense the satellite 100 from the satellite stack 202. As the cable 236 is pulled towards the pulley 234, the spacer 302 on which the satellite 100 is supported pushes the satellite 100 away from the base 204. Once the satellite 100 becomes most distal to the base 204 relative to other satellites 100 in the satellite stack 200, the spacer 302 most distal to the base 204 retains the satellite 100 within the satellite stack 202. Then, as the cable 236 is pulled, the spacer 302 most distal to the base 204 moves over the pulley 234 and no longer retains the satellite 100 within the satellite stack 202. The spacer 302 that supports the satellite 100 pushes the satellite 100 out of the satellite stack 202 and into space.

The motor 210 can include a winch, including a shaft which rotates and causes the cable 236 to wrap around the shaft and shorten in deployed length (i.e., length of cable extending from the motor 210 to the last spacer 302). The portion of the cable 236 between the motor 210 and the pulley 234 is pulled towards the motor 210 from the pulley 234. The portion of the cables 236 between the pulley 234 and the satellite stack 202 is pulled towards the pulley 234. The cable 236 can have a termination point at the spacer 302 that supports the bottom-most satellite 100 of the satellite stack 202.

Alternatively, the cable 302 can be a continuous or single loop. When the cable 302 is a loop, the motor 210 can include a shaft having openings therein or fingers extending therefrom. The openings or fingers can engage the spacers 302 as the spacers 302 pass along the shaft. The openings or fingers exert a force on the spacers 302 to cause movement of the cable 236.

To load each satellite 100, the satellite 100 is placed on the spacer 302. When the cable 236 is a loop, the motor 210 draws the spacer 302 supporting the satellite 100 towards the base 204. The satellite 100, therefore, moves towards the base 204. As the next spacer 302 becomes perpendicular to the central or external support column, the next satellite 100 is placed onto the spacer 302. This can be performed for any number of satellites for any number of columns. Alternatively, when the cable 236 is not a loop, it unwinds instead of loops as the satellites are loaded between each spacer and moved towards the base.

Figure 4:
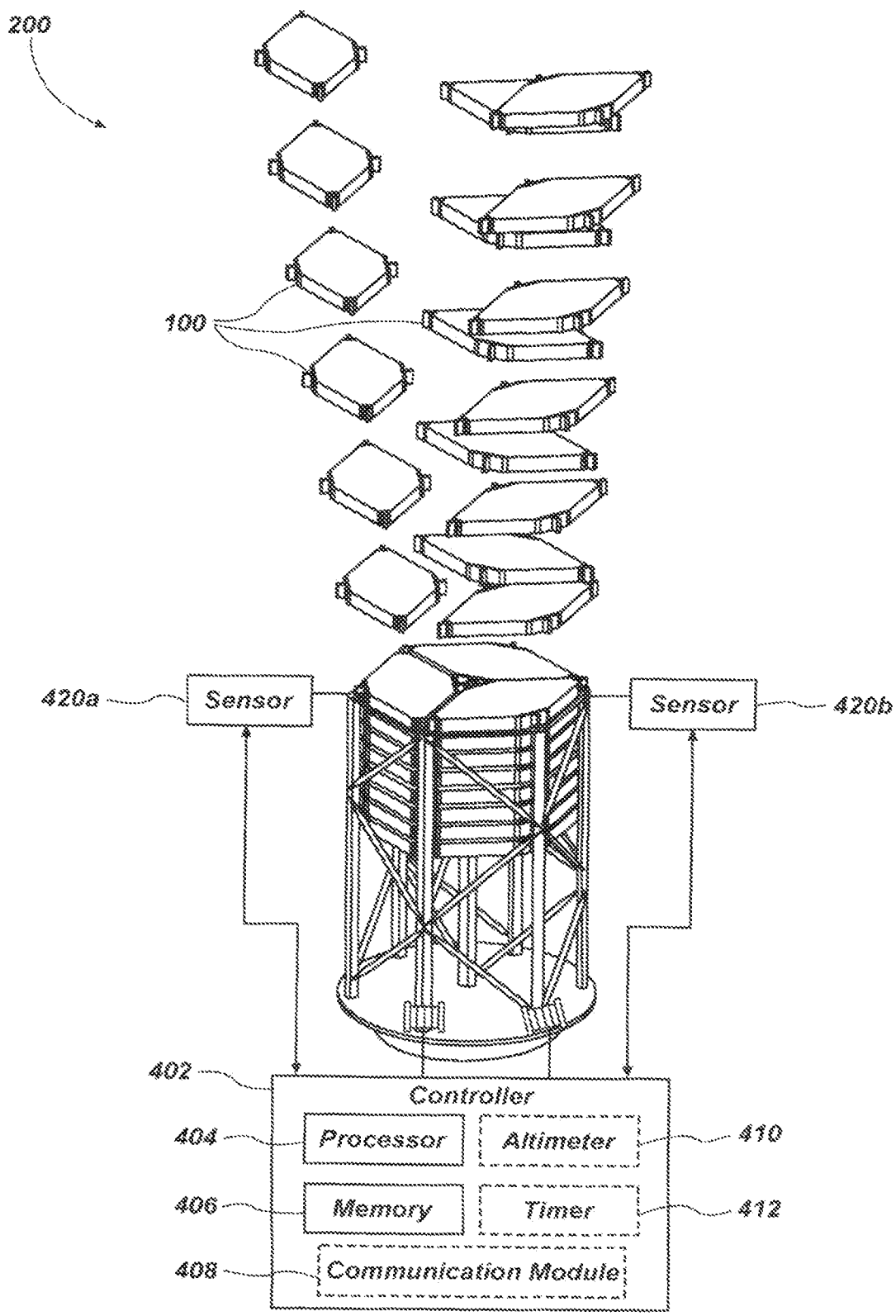
FIG. 4 illustrates example satellites being dispersed from the example stacked satellite dispensing system of FIG. 2.

FIG. 4 shows the satellites 100 being dispersed from the stacked satellite dispensing system 200. Among other things, satellite dispensing system 200 includes a processor 404, a memory 406, a communication module 408, an altimeter 410, and a timer 412. To disperse the satellites 100, the motors 210 are activated, which applies a force to the cables 236. The force places the cables 236 in tension and causes the cables 236 to translate along or about an axis. As the cables 236 translate, the spacers 302 force the satellites 100 away from the base 204. The uppermost satellite is retained within the stacked satellite dispensing system 200 by the spacer 302 above the satellite 100 and optionally a locking or securing mechanism (not shown). The satellite 100 is no longer retained once that spacer 302 moves toward or onto the pulley 234. As the cable 236 continues to translate, the spacer 302 beneath the satellite 100 exerts a force on the satellite 100. The satellite 100 is then deployed into orbit.

When the stacked satellite dispensing system 200 includes multiple columns of satellites 100, each of the motors 210 associated with the respective columns can be separately activated or can be activated in one or more combinations (e.g., first and third motors can be activated, then a second motor can be activated).

When activated, the motor 210 can run until a given number of satellites 100 are deployed from each column. In one example, to determine the number of satellites deployed, the stacked satellite dispensing system 200 can include sensors 420a, 420b that are tripped as satellites pass. The sensors 420a, 420b can transmit the number of satellites 100 dispensed to the controller 402 via a wired or wireless connection (e.g., Bluetooth®, infrared, WiFi, or the like). Once the given number of satellites has been dispensed, the controller 402 can transmit a signal to the motors 210 to deactivate (i.e., turn off) the motors 210. Therefore, no more satellites 100 are dispensed until the motors 210 are re-activated.

Alternatively, the motor 210 can run for a given amount of time. The number of satellites deployed can be determined based on the speed at which the motor 210 runs or based on a time calculated from previous satellite deployments. Once the given number of satellites has been dispensed, the controller 402 can transmit a signal to the motors 210 to deactivate (i.e., turn off) the motors 210. Therefore, no more satellites 100 are dispensed until the motors 210 are re-activated.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

What is claimed is:

1. A satellite dispensing system, comprising:
   vertical structural channels each having a length extending from a base to an open output end, each of the vertical structural channels configured to slidably interface with a protruding portion of a satellite;
   structural bracing which supports the vertical structural channels against lateral loads;
   a cable pulley respectively associated with each of the vertical structural channels, the cable pulley configured to mechanically interface with the satellite, and the cable pulley respectively configured to direct a portion of cable through each of the vertical structural channels;
   at least one spacer coupled to the portion of cable and each of the at least one spacer is configured to interface with the protruding portion of the satellite; and
   motors responsive to a command to dispense the satellite by respectively driving the cable pulleys and the at least one spacer in a direction that lifts the satellite upward along the vertical structural channels until the satellite is driven past the open output end of the vertical structural channels.

2. The satellite dispensing system of claim 1, further comprising:
   a satellite column having a polygonal periphery that includes the vertical structural channels, wherein the satellite column is configured to contain multiple satellites, wherein each of the multiple satellites is separated by a respective spacer to space apart each of the satellites within the satellite column.

3. The satellite dispensing system of claim 1, wherein the satellite dispensing system comprises three or more vertical structural channels.

4. A satellite dispensing system, comprising:
   a channel having a length extending from a base to an output;
   multiple satellites positioned within the channel, each of the multiple satellites including a protruding appendage;
   a spacer positioned between two of the multiple satellites;
   a dispensing element extending along the length of the channel and structured to cause the multiple satellites to move in a direction towards the output of the channel, wherein
     the two of the multiple satellites are coupled via the spacer to the dispensing element and moveable with the dispensing element and the spacer along the length of the channel from the base to the output,
     the spacer is connected to the dispensing element, and
     the spacer is configured to interface with each of the protruding appendage of the two of the multiple satellites; and
   a pulley configured to direct a portion of the dispensing element through the channel.

5. The satellite dispensing system of claim 4, further comprising a motor to which the dispensing element is engaged, wherein the motor, when activated, is structured to cause the multiple satellites to move towards the output of the channel.

6. The satellite dispensing system of claim 5, further comprising a controller configured to transmit a signal to the motor to activate the motor in response to a received activation input.

7. The satellite dispensing system of claim 6, further comprising a timer configured to cause the controller to transmit a signal that includes the activation input scheduled, based on the timer, to be transmitted at a post-launch time.

8. The satellite dispensing system of claim 6, further comprising an altimeter configured to measure an altitude of a space vehicle in which the satellite dispensing system is positioned, the controller configured to receive altitude data from the altimeter as the activation input and to transmit the signal to activate the motor based on the altitude data.

9. The satellite dispensing system of claim 4, wherein the dispensing element includes a cable.

10. The satellite dispensing system of claim 9, wherein the pulley is proximal to the output of the channel, the pulley being structured to engage the cable to move the multiple satellites in a direction towards the output of the channel.

11. The satellite dispensing system of claim 4, wherein the channel is a first channel, and further comprising a column including the first channel, a second channel, and a third channel, the column extending from the base to the output of the first channel, an output of the second channel, and an output of the third channel.

12. The satellite dispensing system of claim 11, further comprising a strut extending at an oblique angle from the first channel to the second channel.

13. The satellite dispensing system of claim 4, further comprising additional spacers, wherein adjacent ones of the multiple satellites are separated by a respective one of the additional spacers to space apart the adjacent ones of the multiple satellites within the channel.

14. The satellite dispensing system of claim 4, further comprising an additional spacer, wherein a first group of the multiple satellites is separated by the additional spacer from a second group of the multiple satellites.

15. A satellite dispensing system, comprising:
an array of vertical structural channels having a length extending from a base to an open output end, wherein a first group of the vertical structural channels is/are placed along a perimeter, and a second group of the vertical structural channels is/are placed along a central axis of the array of vertical structural channels;
parallel satellite columns configured to contain and interface with stacks of satellites such that protruding appendages of each satellite mechanically interface with the first group of the vertical structural channels and the second group of the vertical structural channels;
structural bracing that supports the vertical structural channels against lateral loads;
cable pulleys respectively positioned proximal to the open output end of each of the vertical structural channels and configured to mechanically interface with each satellite, each of the cable pulleys respectively configured to direct a portion of cable through each of the vertical structural channels;
a spacer coupled to the portion of cable in one of the vertical structural channels, wherein the spacer is configured to interface with the protruding appendages of two adjacent satellites of the stack of satellites in the one of the vertical structural channels; and
a motors configured to drive one of the cable pulleys and the spacer in a direction that lifts the two adjacent satellites in the one of the vertical structural channels upward along the one of the vertical structural channels until the two adjacent satellites are driven free, past the open output end of the one of the vertical structural channels.

16. The satellite dispensing system of claim 15, wherein the two adjacent satellites in the one of the vertical structural channels are separated by the spacer to space apart the two adjacent satellites within the one of the vertical structural channels.

17. The satellite dispensing system of claim 16, wherein the spacer is mechanically connected to the cable pulleys.

18. A method of dispensing satellites, comprising:
positioning multiple satellites within a channel, the channel having a length extending from a base to an output, wherein each of the multiple satellites includes a protruding appendage;
arranging a pulley-activated cable to be within the channel;
arranging a channel interface that mechanically interfaces with each of the multiple satellites via the protruding appendage to engage the multiple satellites with the channel;
placing a spacer, which is attached to the pulley-activated cable, between two of the multiple satellites, wherein the spacer is configured to interface with the protruding appendage of each of the two of the multiple satellites; and
operating a motor to dispense the multiple satellites by driving the pulley-activated cable and the spacer in a direction toward the output of the channel.

19. The method of claim 18, further comprising dispensing one of the multiple satellites by operating the motor to drive the pulley-activated cable and the spacer to move the multiple satellites within the channel in the direction toward the output of the channel until a single satellite is ejected from the output of the channel.

20. The method of claim 18, further comprising dispensing a first group of the multiple satellites by operating the motor to drive the pulley-activated cable and the spacer to move the multiple satellites within the channel in a direction toward the output of the channel until the first group of satellites is ejected from the output of the channel.

21. The method of claim 18, further comprising dispensing one of the satellites by operating the motor to drive the pulley-activated cable and the spacer to commence moving the multiple satellites within the channel in the direction toward the output of the channel at a post-launch time.

22. The method of claim 18, further comprising:
receiving altitude data correlating to an altitude of a space vehicle in which the multiple satellites are positioned; and
dispensing one or more of the multiple satellites by operating the motor to drive the pulley-activated cable and the spacer to start moving the multiple satellites within the channel in the direction toward the output of the channel at a dispensing altitude that is based on the altitude data.

* * * * *